United States Patent [19]

Porter

[11] 4,144,871
[45] Mar. 20, 1979

[54] SOLAR HEAT COLLECTOR

[76] Inventor: Donald F. Porter, 130 Ramsey Pl., Albany, N.Y. 12209

[21] Appl. No.: 775,042

[22] Filed: Mar. 7, 1977

[51] Int. Cl.² .............................................. F24J 3/02
[52] U.S. Cl. ...................................... 126/270; 165/56
[58] Field of Search .................. 126/270, 271; 165/49, 165/53, 54, 56, 139, 119; 220/415

[56] References Cited

U.S. PATENT DOCUMENTS

| 2,392,240 | 1/1946 | Frankel | 165/56 |
| 2,680,437 | 6/1954 | Miller | 126/270 |
| 3,946,892 | 3/1976 | Rigal et al. | 220/415 |
| 4,007,728 | 2/1977 | Guba | 126/270 |
| 4,016,861 | 4/1977 | Taylor | 126/270 |
| 4,018,211 | 4/1977 | Barr | 126/271 |
| 4,038,969 | 8/1977 | Smith | 126/271 |
| 4,072,142 | 2/1978 | Lof | 126/270 |
| 4,073,282 | 2/1978 | Schriefer, Jr. | 126/271 |

Primary Examiner—William F. O'Dea
Assistant Examiner—Larry Jones
Attorney, Agent, or Firm—John P. Snyder

[57] ABSTRACT

A solar heat collector features a collector panel of double compartment form. One compartment provides a dead air space and the other compartment is provided for heat collection purposes. Such other compartment is subdivided into a series of chambers by means of permeable heat transfer devices. One chamber at one end of the series is provided with a cold air inlet and the opposite end of the compartment is provided with a hot air outlet. Air passes from one compartment to the other by passage through the permeable transfer devices and intermediate chambers are provided with labyrinth baffling means to retard and slow down the flow of air to assure an even cross sectional air flow.

8 Claims, 6 Drawing Figures

SOLAR HEAT COLLECTOR

BACKGROUND OF THE INVENTION

Contemporarily, there is a demand for alternate forms of heating systems for houses and the like in order not only to cut down on the consumption of fossil fuels but also to minimize or limit pollution of the atmosphere incidental to the burning of fossil fuels.

To this end, a number of solar heating systems have been purposed but they are special installation units and require substantial space to provide sufficient area of solar heat extraction in order to bring the heated medium up to practical temperatures for the purpose of heating homes or providing a supply of hot water therefore.

BRIEF SUMMARY OF THE INVENTION

According to the present invention, the large areas heretofore necessary is substantially reduced by the novel construction of solar heat collector. Basically, the heat collector is of double compartment form with one compartment acting as a dead air space or insulating space while the other compartment is provided with a cold air intake and a hot air outlet at opposite ends thereof. The heating compartment is also subdivided into a series of chambers, the chambers being separated by permeable heat transfer devices such as honeycomb structures or radiator cores and these heating elements are effective to slow down the flow of air through the heating compartment and spread the flow of air evenly thereacross. Intermediate compartments of the heating space are provided with labyrinth baffling means which assures an even and uniform flow cross sectionally through the compartments from the cold air inlet to the hot air outlet ends thereof.

BRIEF DESCRIPTION OF THE DRAWING FIGURES

DETAILED DESCRIPTION OF THE INVENTION

Figure 2:
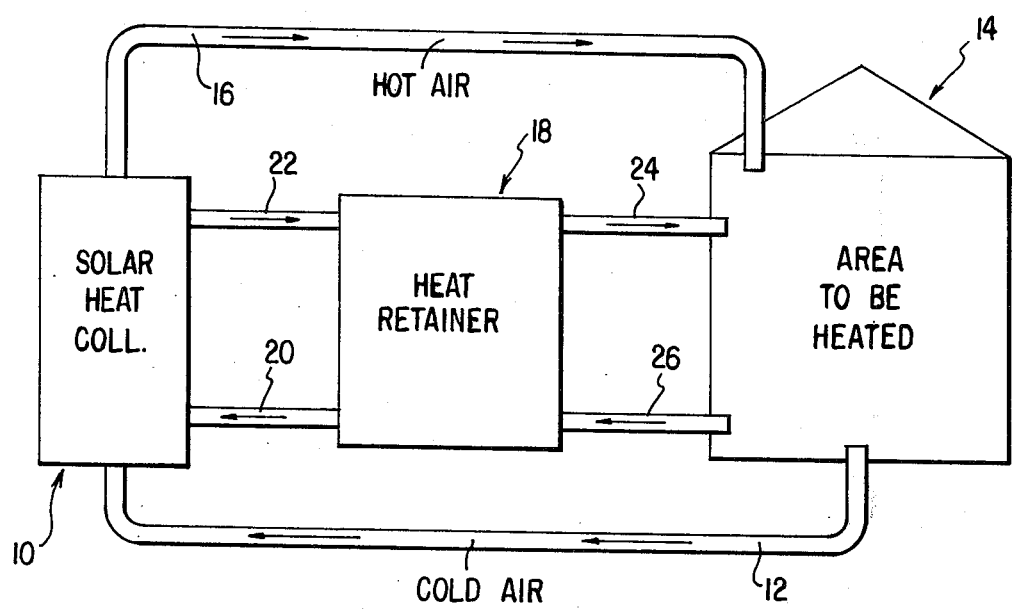
FIG. 2 is a diagrammatic view of a heating system employing the solar heat collector according to this invention.

Referring at this time more particularly to FIG. 2, a diagrammatic layout of the typical heating system with which the present invention may be used is illustrated therein. In FIG. 2, the solar heat collector according to the present invention is indicated generally therein by the reference character 10 and will be seen to have a connection to a cold air inlet heat or conduit system 12 returning from the space to be heated as for example inside a home indicated generally by the reference character 14. The solar heat collector 10 is also provided with a hot air outlet conduit system 16 which, as shown, discharges into the space being heated within the home 14. A heat retainer unit 18 may also be associated with the system as illustrated in FIG. 2 and, as shown, is provided with recirculation conduits 20 and 22 connected to the solar heat collector 10 and recirculation conduits 24 and 26 connected to the area to be heated within the structure 14. The heat retainer 18 may be of any conventional form wherein heat supplied by the collector 10 to the air recirculated at 20 and 22 is stored for abstraction by the recirculated air at 24,26 connected with the home 14.

Figure 1:
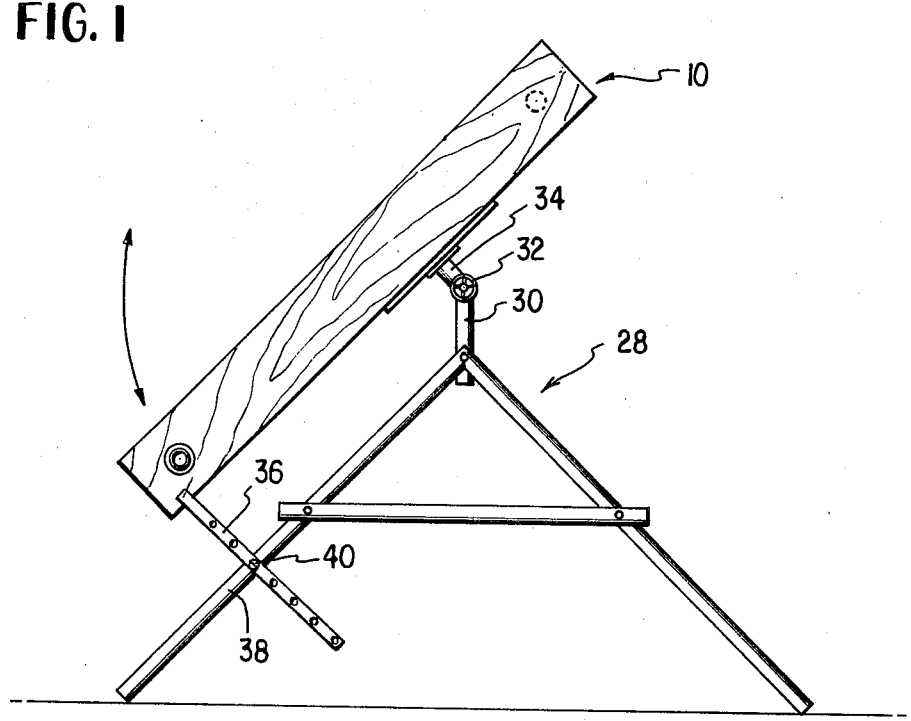
FIG. 1 is an elevational view showing a solar collector according to this invention and a suitable support or stand therefor.

In FIG. 1, a solar heat collector 10 according to this invention is shwon mounted on a suitable base or stand which may comprise a legged stand indicated generally by the reference character 28 and provided with an upright 30 having a pivot 32 connected to the support structure 34 secured to the underside of the heat collector 10. The strut 36 extends between the lower end of the collector 10 and is secured to the leg 38 of the stand by means of a suitable fastener 40. The strut 36 is provided with a series of holes as shown whereby to alter the inclination or angle of the solar heat collector 10 in that manner most advantageous to face the sun.

It will be understood that a plurality of devices such as are shown in FIG. 1 may constitute the heat collector system of the present invention. Further, it will be appreciated that the collector or collectors 10 may be fixed in place, if desired.

Figure 3:
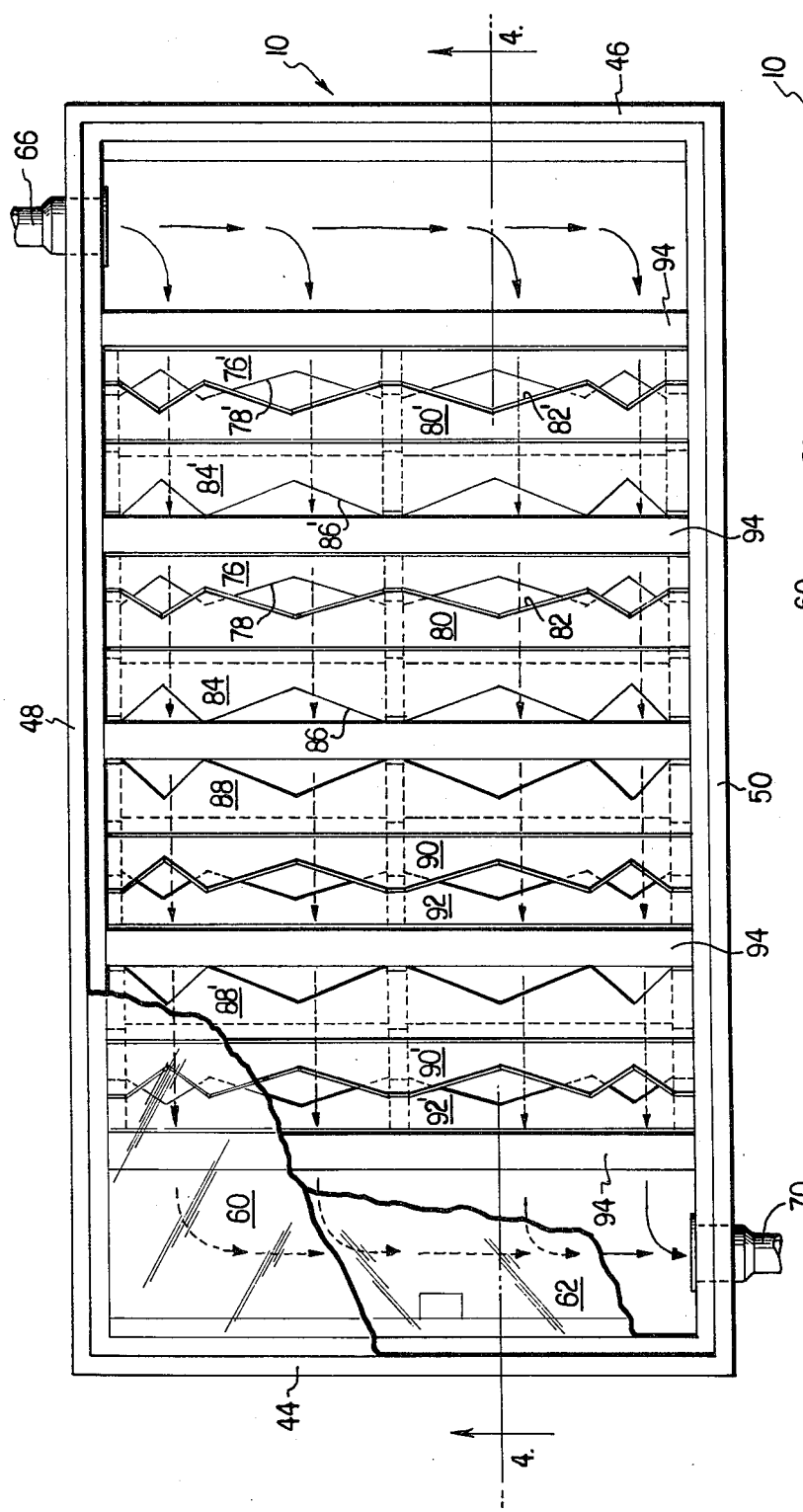
FIG. 3 is a top plan view partly broken away showing internal details of my solar heat collector.
Figure 4:
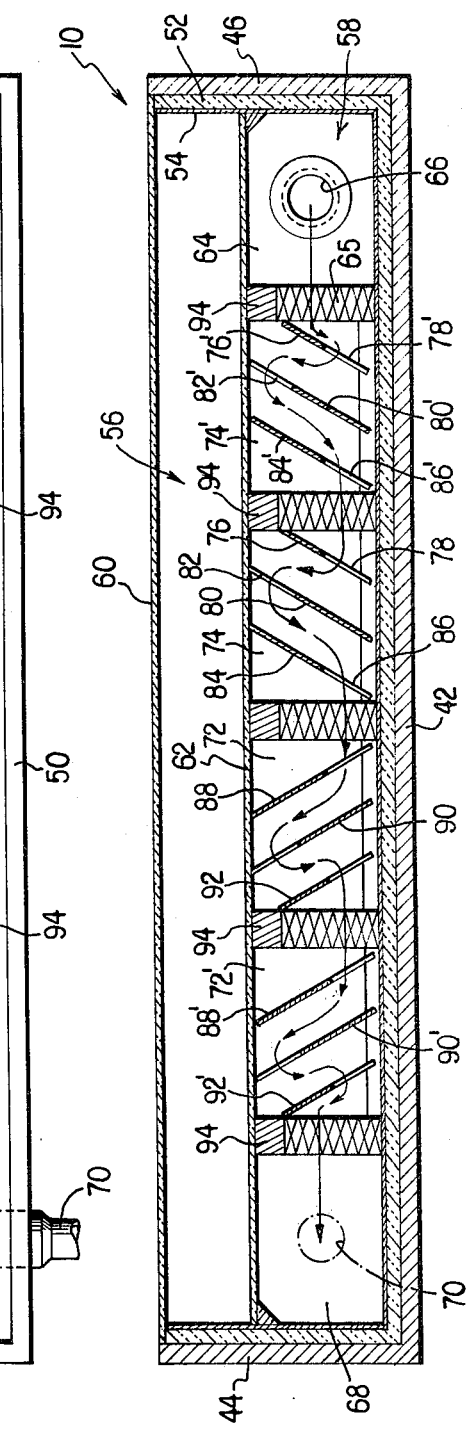
FIG. 4 is a vertical section taken generally along the plane of section line 4—4 in FIG. 3 and showing further details of the internal construction of the solar heat collector.

FIGS. 3 and 4 illustrate the structural details or a heat collector 10. As illustrated, the body of the heat collector includes a bottom wall member 42, the opposite end wall members 44 and 46 and the opposite side wall members 48 and 50. Conveniently, this construction may be of plywood or other durable material having good heat insulating properties. The inner side of the housing is lined with insulating material as indicated by the reference character 52 and on the inner side of this there may be provided a sheet metal liner such as that indicated by the reference character 54 and which is painted flat black on its inner surface whereby to maximize the heat collection potential of the collector 10. The solar heat collector is subdivided into two basic compartments, the insulating space 56 and the heating space 58. The cover for the solar heat collector is transparent and consists preferably of a sheet of plexiglass as indicated by the reference character 60 and positioned in spaced parallel relationship thereto is a glass sheet or sheets indicated by the reference character 62 so that the two sheets 60 and 62 constitute the dead air insulating space or compartment 56 as described. The heating compartment 58 is further subdivided into a series of chambers such as the inlet chamber indicated by the reference character 64, the chambers being separated from one another by the heat transfer elements 65 which extend from one side to the other of the compartment 58, as is illustrated. The inlet compartment 64 is provided with a cold air inlet duct or coupling 66 whereas the chamber 68 at the opposite end of the collector is provided with a hot air outlet duct or coupling 70 as is illustrated.

In the intermediate chambers 72, 72' and 74, 74' labyrinth baffle plate means are provided to slow down the flow of air and assure an even cross sectional distribution of air flow through the heat transfer elements 65. To this end, it will be noted that the heat transfer devices 65 may simply take the form of honeycomb structures or the like constructed of aluminum and constituting permeable wall separators between adjacent chambers of the compartment 58.

The baffling system takes the form of toothed plates extending from between the opposite side walls 48 and 50 of the solar collector 10 with the toothed portions of these baffle plates being oppositely directed. For example, for the specific baffling embodiment shown in FIG. 4, the first baffles 76, 76' in the chambers 74 and 74' are secured in place with the teeth thereof pointing downwardly, such teeth being indicated by the reference characters 78 and 78' in FIG. 3 and also in FIG. 4.

The next baffles 80, 80' in these chambers are secured in place with their teeth 82, 82' pointing upwardly and the last baffles 84, 84' are secured in place with their teeth 86, 86' pointing downwardly as shown. The baffles, 88, 88', 90, 90' and 92, 92' in the next compartments 72, 72' are in the reverse order as is illustrated. The net effect of the baffling is to assure that the air does not channel or flow through the heat collector, thereby assuring an even cross sectional distribution of air flow through the collector system.

An important feature of the invention is the provision of insulating strips 94 between the heat transfer devices 65 and the transparent sheet or window 62. This construction effectively insulates the elements 65 and causes them to give up their heat only to the air flowing through the collector. All of the elements within the compartment 58 and 72,74 may be painted flat black to absorb as much solar heat as possible. One of the essential functions of a solar heat collector is to provide an assembly which attains an internal temperature as high as possible. Often, the temperatures attained are quite low even when the collector is subjected to direct sunlight. The collector disclosed here is capable of attaining internal temperatures in excess of 190° F., resulting in very high efficiency. For example, a solar collector as disclosed herein and having dimensions of 4' × 8', and supplied with controls as hereinafter described for operating a fan circulating air at 300 cfm (6" inlet and outlet conduits), permitted 39% reduction in conventional fuel costs or 29% in consumption, in heating a 1½ story, ranch style home of 1976 ft.$^2$ size. The home is located in Albany, New York and the figures quoted are for the 1976-77 winter season which was the coldest winter on record this locale. No heat storage facility as 18 in FIG. 2 was employed.

Figure 5:
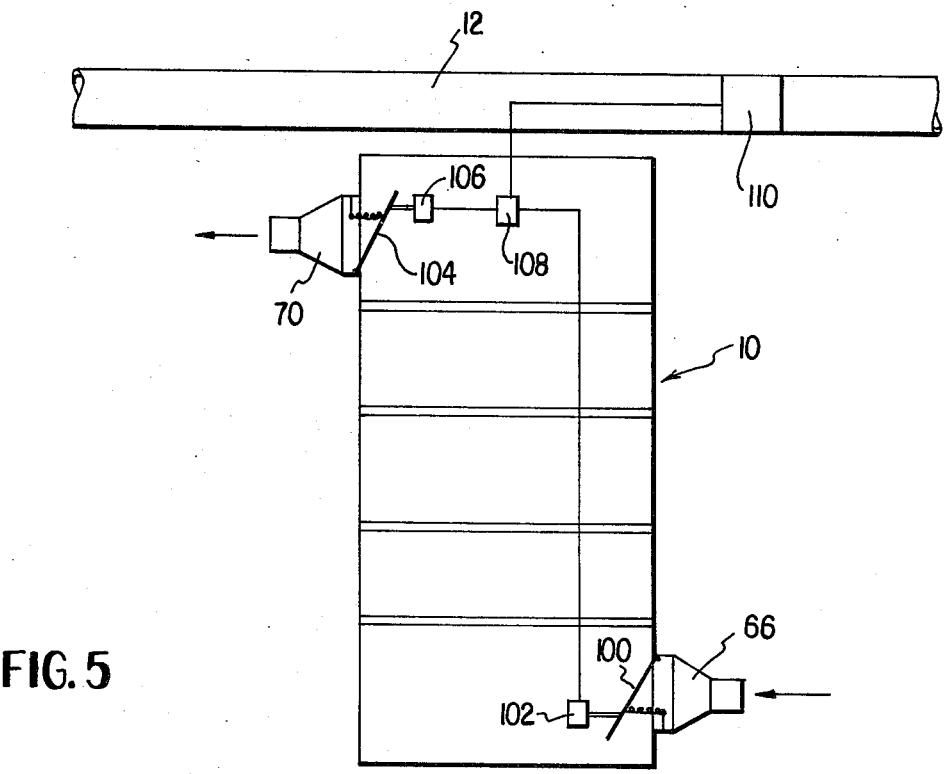
FIG. 5 is a diagrammatic view illustrating certain controls utilized with this invention.

FIG. 5 illustrates diagrammatically the control system associated with the solar heat collector 10. As illustrated in FIG. 5, the inlet coupling or duct 66 is provided with a valve plate 100 operated by the solenoid or other actuator 102 and the outlet connection 70 is likewise provided with a control valve 104 controlled under the action of a solenoid 106. The temperature sensor 108 is located in the interior of the chamber 68 and operates upon the attainment of a predetermined temperature therein to actuate the solenoids 102 and 106 and open the valve plates 100 and 104. At the same time, the temperature sensor 108 energizes a fan 110 located in the hot air return line 12, see FIG. 2, to commence a forced air circulation of air through the solar heat collector.

Figure 6:
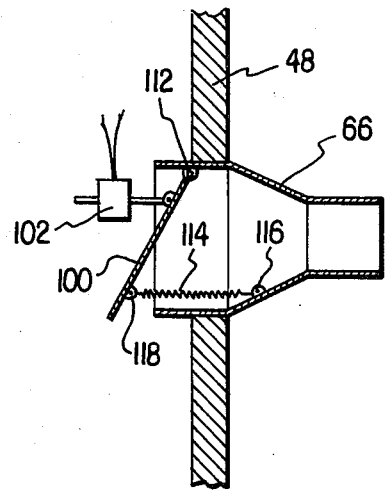
FIG. 6 is an enlarged sectional view taken through the cold air inlet to the solar heat collector.

FIG. 6 shows details of a valve plate control. It will be noted that the inlet coupling 66 is secured through the side wall 48 of the solar heat collector 10 and that the valve plate 100 is pivoted at 112 and is normally urged by the tension spring 114 anchored at its opposite ends to the member 116 attached to the inlet member 66 and its opposite end to the element 118 on the valve plate 100, the spring 114 normally urging the valve plate 100 to closed position.

What is claimed is:

1. A solar heat collector comprising, in combination:
   a body defining an enclosed space including spaced side walls and provided with outer and inner windows disposed in spaced relation to each other to define an outer insulating compartment between said windows and an inner heating compartment below said inner window;
   a plurality of permeable heat transfer devices disposed in spaced relation to each other and transverse to said side walls within said heating compartment to divide the interior thereof into a series of chambers communicating serially with each other through said permeable heat transfer devices;
   an air inlet communicating with one end chamber of said heating compartment and an air outlet communicating with the other end chamber of said heating compartment, and baffle means in others of said chambers for creating lateral spreading and serpentive air flow serially through said chambers, said baffle means lying transverse to said walls; and
   insulating strip means interposed between said heat transfer devices and said inner window, and wherein said baffle means comprises a series of spaced, toothed plates extending in directions parallel to said heat transfer devices.

2. A solar heat collector as defined in claim 1 wherein the interior of said collector and the components therein are painted black.

3. A solar heat collector as defined in claim 2 wherein said baffle means is located in each of said chambers other than said end chambers.

4. A solar heat collector as defined in claim 1 wherein said toothed plates are inclined.

5. A solar heat collector as defined in claim 4 wherein the teeth of adjacent plates within a chamber are oppositely directed.

6. A solar heat collector as defined in claim 1 wherein said baffle means is located in each of said chambers other than said end chambers.

7. A solar heat collector as defined in claim 1 wherein the teeth of adjacent plates within a chamber are oppositely directed.

8. A solar heat collector as defined in claim 7 wherein said toothed plates are inclined.

* * * * *